May 20, 1958
E. R. BOYNTON
2,835,437
SHAFT BEARING LUBRICATION MEANS
Filed May 9, 1956
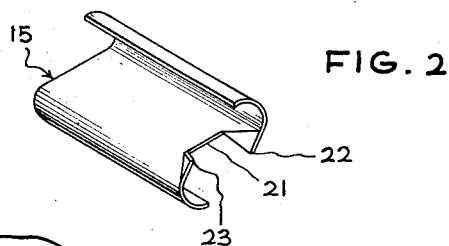
FIG. 2
FIG. 1
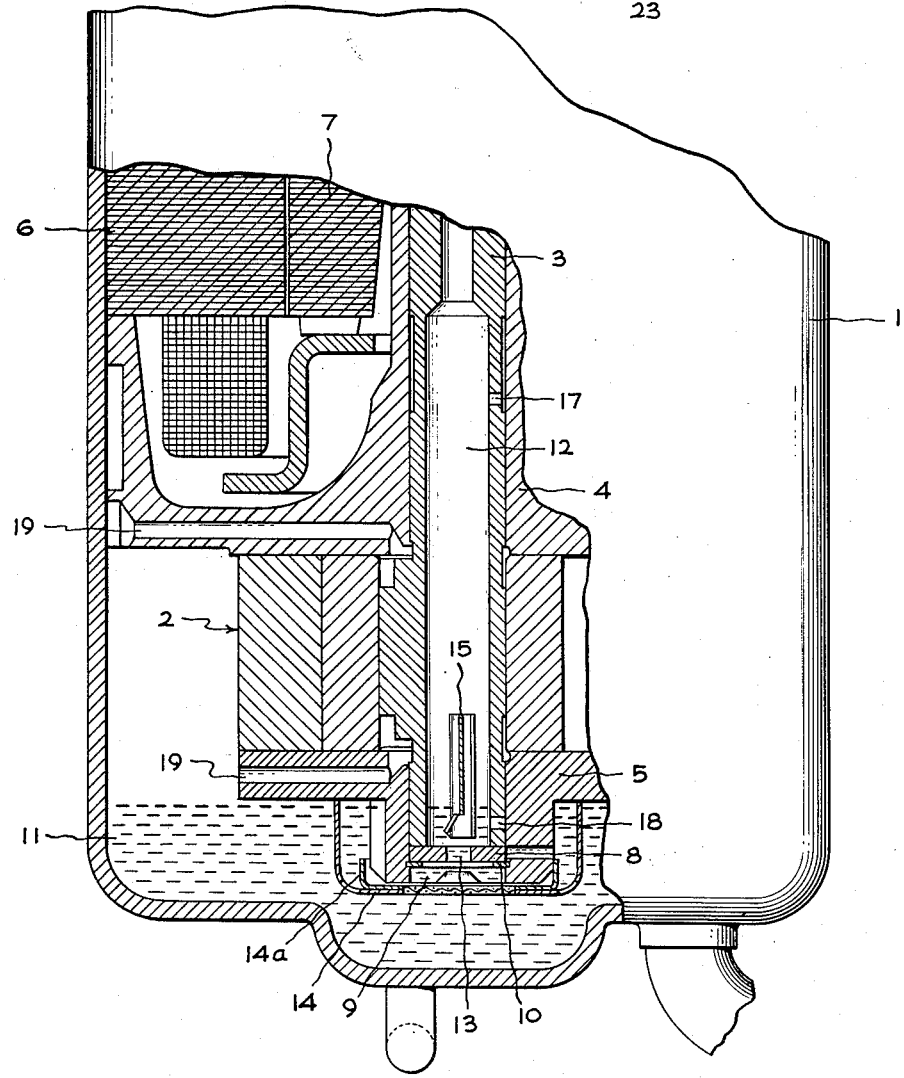
INVENTOR.
ERWIN R. BOYNTON
BY
HIS ATTORNEY United States Patent Office 2,835,437
Patented May 20, 1958

2,835,437

SHAFT BEARING LUBRICATION MEANS

Erwin R. Boynton, Louisville, Ky., assignor to General Electric Company, a corporation of New York Application May 9, 1956, Serial No. 583,755

2 Claims. (Cl. 230—207)

The present invention relates to the lubrication of shaft bearings, and more particularly to an improved arrangement for the lubrication of bearings for vertical shafts.

Although it will be understood that the invention is broadly applicable to the lubrication of bearings supporting a shaft adapted to rotate about a vertical or inclined axis, it is particularly useful in connection with rotary refrigerant compressors arranged to rotate about a substantially vertical axis, and for the purpose of illustration, the invention will be shown and described in connection with such a compressor.

One form of hermetic compressor of this type includes a hermetic casing housing a compressor unit and a motor for driving the compressor which are mounted one above the other on a common vertical shaft. The shaft is journalled into axially aligned bearings suitably supported within the casing. The lower portion of the hermetic casing contains a body of lubricating oil which is employed to lubricate the various bearing surfaces of the compressor unit. In order to provide the proper lubrication of any bearing surfaces above the normal oil level, it is, of course, necessary to provide some means for conveying lubricating oil from the oil reservoir to such surfaces.

A simple known means for providing lubrication for bearing surfaces disposed above the normal oil level in the reservoir is to extend the shaft to a point below the normal level of the body of lubricating oil contained in the lower portion of the casing and provide an axially extending passage within the shaft which communicates with the body of oil. The proper operation of this type of lubricating system requires that the lubricant entering the lower portion of the lubricant passage quickly assumes the rotational speed of the shaft so that the resultant centrifugal force will cause the oil to flow upwardly along the inner surface of the passage and into suitable oil outlets which transmit lubricant to the bearing surfaces. The time required for the lubricant within the passage to assume the rotational speed of the shaft and thereupon flow upwardly along the surface of the passage depends upon the viscosity of the lubricant. If the lubricant is of high viscosity, it very quickly assumes the same rotational speed as the shaft, and consequently lubricant reaches the bearings shortly after the shaft begins to rotate. However when the lubricant is of extremely low viscosity it does not readily assume the full rotational speed of the shaft and consequently does not begin to flow upwardly to the bearings soon enough to supply the proper bearing lubrication. In a refrigerant compressor, the lubrication oil is more than likely to be of extremely low viscosity due to the fact that it is often diluted by the refrigerating medium or because it is very hot. In either case there is a very great likelihood of the bearing burning out before proper lubrication is supplied.

It is an object of this invention to provide a centrifugal lubricating arrangement for bearings disposed above a body of lubricant including a simple and effective means for imparting to the lubricant a rotational movement sufficient to obtain the desired lubricating action.

Another object of this invention is to provide an improved bearing lubricating means which operates effectively with lubricants of varying viscosities.

More specifically, it is the object of this invention to provide an improved means for making the lubricant quickly assume the rotational speed of the shaft in a centrifugal lubricating means of the type in which a lubricant enters an axial lubricant passage within a rotating shaft.

Further objects of the invention will become apparent as the following description proceeds and the features of novelty which characterize the invention will be pointed out with particularity in the claims annexed to and forming a part of this specification.

In carrying out the objects of this invention, there is provided a vertically arranged shaft rotatably supported by bearing surfaces, at least one of which is above the level of an oil supply which communicates with an axially extending passage within the shaft. One or more oil outlets leading from the axial passage are provided on the circumference of the shaft at the bearing surface area. Lubricant entering the axial passage is forced to assume the rotational speed of the shaft by a vertical paddle which is disposed within the axial passage in the lower or immersed end of the shaft passage. Centrifugal force then causes the oil to flow outwardly against the surfaces of the passage and upwardly along the passage into the oil outlets and to the bearing surface area.

For a better understanding of the invention, reference may be had to the accompanying drawing in which Fig. 1 is a side elevation view, partly in section, of a hermetic refrigerant compressor incorporating an embodiment of the invention; and Fig. 2 is a perspective view of the paddle according to one embodiment of the invention.

Referring to the drawing, my invention is shown in one form as having a hermetic compressor including a hermetic casing 1 in which is suitably supported a refrigeration compressor unit 2 which includes a vertical shaft 3 supported by axially aligned upper and lower bearings 4 and 5. Mounted in the upper portion of the hermetic casing is a motor 6 having a rotor 7 positioned upon the shaft 3 for driving the rotary compressor 2. Serving as a thrust bearing for the shaft 3, a thrust plate or washer 8 is disposed within the cavity 9 in the lower bearing 5 and locked into place by locking ring 10.

In order to provide a source of lubricating oil for the various bearing surfaces of the compressor unit there is employed a reservoir or body of oil 11 in the lower portion of the hermetic casing. This body of oil is of sufficient depth that the lower end of the shaft and a portion of the bearing 3 are substantially immersed in the oil. For the purpose of providing lubricating oil to the various moving parts of the compressor unit 2 and particularly to the bearing 4, an axially extending passage 12 is provided in the shaft 3. The axially extending passage is in communication with the reservoir through a hole 13 provided in the thrust plate 8. In order to prevent dirt and other particles from entering the axially extending passage 12 along with the lubricating oil, a filtering screen is positioned around the end of the bearing cavity 9 and retained in position by a pair of end caps 14 and 14a. In accordance with the present invention, there is disposed across the bottom portion of the axial passage 12 a partially submerged paddle or blade 15 which, upon rotation of the shaft, forces lubricant entering the axial passage to quickly assume the rotational speed of the shaft 3. Centrifugal force then causes the lubricant to flow outwardly against the inner surface of the axial passage 12 and thereupon causes the lubricant to flow upwardly along the inner surface of the passage 12. Oil outlets 17 and 18 in the circumference of the shaft transmit lubricant to the various bearing surfaces. Suitable channels 19 located in the bearing supports provide a means for returning lubricant from the bearings back into the oil reservoir 11.

In the embodiment of the invention, as shown in Fig. 2, the paddle 15 takes the form of an S-shaped piece of spring sheet metal. The distance between the curved portions of the S-shaped paddle 15, prior to its insertion into the passage 12, is slightly larger than the inner diameter of the axial passage 12. By compressing the curved portions of the S-shaped paddle toward each other, the paddle can be inserted into the passage, and then upon release, the curved portions of the paddle will tend to resume their normal position. By forcing outwardly against the inner surface of the axial passage 12 the curved portions will hold the paddle firmly in position within the passage. This illustrates one means for holding the paddle 15 within the axial passage 12, however, other means well known to those familiar with the art may be used, such as welding or brazing.

Preferably, means are also provided upon the paddle which impart an additional upward thrust to the oil within the passage. As shown in Fig. 2, these means comprise a slit or notch 21 adjacent the center line of the paddle 15 and extending a short distance up the lower end of the paddle. By bending a portion of each half of the slit section, such as corners 22 and 23, forwardly and outwardly in the direction of rotation, an upward and outward thrust is given to oil by these bent corners during rotation of the shaft.

Through the present invention there is provided a lubricating arrangement which will operate under all conditions even though the lubricating oil may be diluted with refrigerant or may be at a very high temperature thereby having a low viscosity. The arrangement set forth in the above description will insure that the fluid within the vertical passage quickly assumes the shaft speed so that centrifugal forces thereby created within the passage will cause the fluid to flow upwardly along the inner surface of the passage to the oil vents thus lubricating the upper bearing surfaces.

While there has been shown and described a specific embodiment of this invention, it is to be understood that the invention is not limited to the particular form shown and described and it is intended by the appended claims to cover all modifications within the spirit and scope of the invention.

What is claimed as new and desired to be secured by Letters Patent is:

1. A bearing lubricating arrangement for a hermetic compressor comprising a hermetic casing for containing a body of lubricating oil in its lower portion, a refrigerant compressor unit positioned within said casing and including a vertically disposed shaft having its lower end submerged in said body of lubricating oil, a bearing surface supporting said shaft and positioned above said body of lubricating oil, a centrifugal pumping arrangement for lubricating said bearing surface comprising an axial passage in said shaft, oil outlets connecting said passage with said bearing surfaces, and a paddle positioned across the lower end of said axial passage, said paddle comprising an S-shaped member formed from spring like material and being retained within said passage by compressive force between the wall of said passage and the curved portions of said S-shaped paddle whereby, upon rotation of said shaft, oil within said axial passage is forced by said paddle to assume the same rotational speed as said shaft and centrifugal forces cause said oil to flow upwardly along the side wall of said passage to said oil outlets.

2. The combination of claim 1 with the lower portion of said paddle being notched along the center line into two halves, and having portions of each half on opposite sides of the center line bent forwardly and outwardly in the direction of rotation of the shaft thereby providing an additional upward thrust on the lubricant during rotation of the shaft.

References Cited in the file of this patent

UNITED STATES PATENTS

| | | |
|---|---|---|
| 913,179 | Wernette | Feb. 23, 1909 |
| 1,665,097 | Huguenin | Apr. 3, 1928 |
| 1,947,016 | Mallory | Feb. 13, 1934 |
| 2,587,246 | Touborg | Feb. 26, 1952 |
| 2,671,405 | Stoors | Mar. 9, 1954 |
| 2,736,264 | Ehlers | Feb. 28, 1956 |